Aug. 7, 1951     F. H. MASON ET AL     2,563,478
ELECTRONIC VULCANIZATION OF SPONGE
RUBBER TO NONRUBBER ARTICLES
Filed July 2, 1947

INVENTORS
FRED H. MASON
AND
SAMUEL C. SCHOTT
BY
ATTORNEYS.

Patented Aug. 7, 1951

2,563,478

UNITED STATES PATENT OFFICE 2,563,478

ELECTRONIC VULCANIZATION OF SPONGE RUBBER TO NONRUBBER ARTICLES

Fred H. Mason and Samuel C. Schott, Akron, Ohio, assignors to The Firestone Tire & Rubber Company, Akron, Ohio, a corporation of Ohio Application July 2, 1947, Serial No. 758,592

5 Claims. (Cl. 154—126.5)

This invention relates to an improved method of bonding sponge rubber such as foamed sponge rubber to non-rubber articles.

An important object of the invention resides in the provision of an improved method of bonding sponge rubber, while in the uncured state, to non-rubber articles.

Another object is to provide an improved "rubber backed" fabric material particularly adapted for upholstery use.

Another object is to provide an efficient method of bonding a foamed sponge rubber under-pad to the backing surface of conventional rugs.

A still further object of the invention is generally to improve and simplify prior art methods of bonding foamed rubber to non-rubber material.

While the advantages to be gained through the employment of sponge rubber pads as rug backing or padding and also as fabric backing are well known, the sponge rubber pads are often employed separately. Attempts have been made to join sponge rubber pads to fabric and other material by use of adhesives, but such attempts have been only partially successful, since an effective bond is difficult to obtain and separation is apt to occur during handling and use. The improved method disclosed herein for vulcanizing the sponge rubber directly to non-rubber material results in an improved product in which the bond is equal in strength to the body of foamed rubber.

Figure 1:
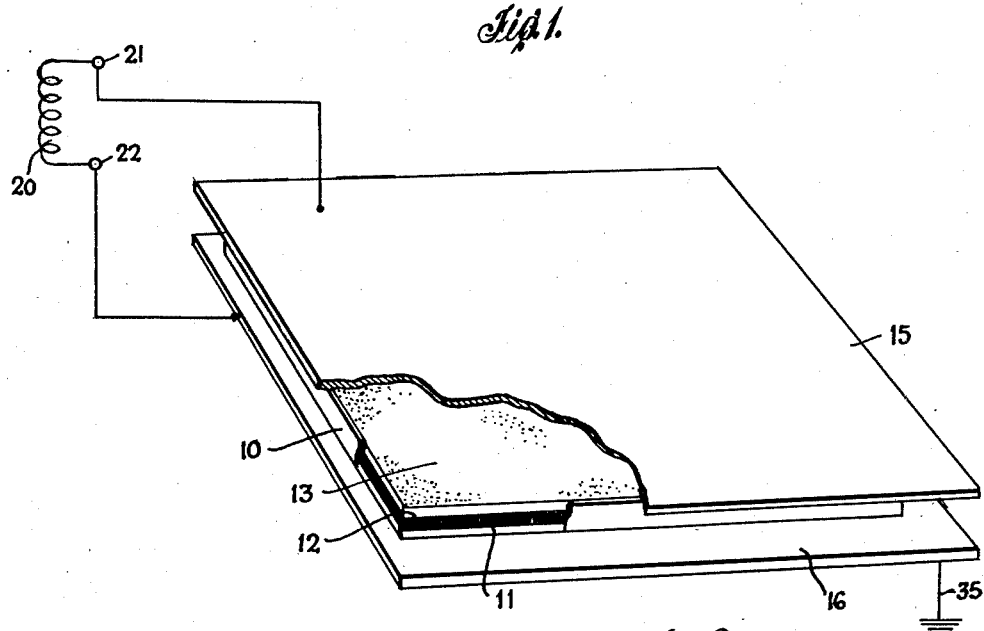
Fig. 1 is a perspective view of a mold containing a rug backed with foamed sponge rubber, in accordance with the principles of the invention, the mold being partially broken away to disclose its contents.
Figure 2:
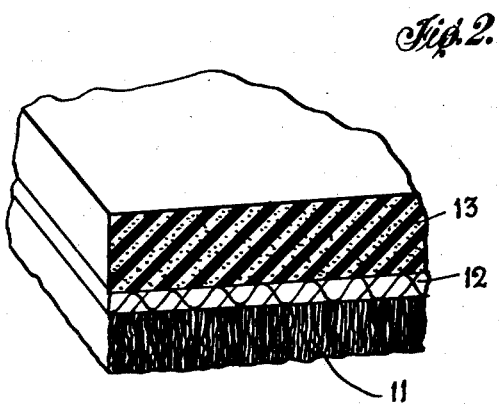
Fig. 2 is an enlarged fragmentary detail of a rug backed with foamed rubber in the manner taught herein.

Referring to Fig. 1, a mold 10 is partially broken away to disclose a rug comprising a nap portion 11 and a base or backing member 12. A layer of uncured foamed rubber 13 extends above the rug in contiguous relation with the surface of backing member 12, the rug as shown being in inverted position. A pair of metallic plates 15 and 16 are disposed above and below mold 10 and spaced equidistant therefrom, plates 15 and 16 serving as electrodes for the creation of a high frequency electrical field therebetween. Electrical energy of suitable high frequency is fed to plates 15 and 16 from an output or tank circuit of an electrical generator such as self-excited high frequency oscillator, not shown, the tank circuit being diagrammatically illustrated by inductance 20, connected through terminals 21 and 22 to electrodes 15 and 16. While the invention is not limited to the employment of high frequency energy of a specific frequency, in actual practice frequencies in the neighborhood of 13 megacycles have proved satisfactory.

The method by which a substantial bond is obtained between the foamed rubber and the backing surface of the rug is as follows. With mold 10 removed from between electrodes 15 and 16, the rug, carpeting, or the like is disposed in inverted position against the bottom surface of a suitable mold of dielectric material, the mold being designed snugly to engage the marginal portions of the item to be treated. If desired, a narrow marginal strip may be masked off, along all edges of the rug, with any suitable material to which the foamed rubber will not adhere upon completion of the cure. The masking material should form an effective fluid seal between the rug and the mold to prevent the uncured foamed rubber batch material from seeping around the rug margins and damaging the rug nap. In the event such masking material is not employed, it is desirable to apply suitable sealing material to effect a fluid-tight joint, and it is of course important that the masking material or sealing material so employed be capable of withstanding temperatures required to effect complete cure of the foamed rubber batch material, and be easily removable from both the rubber and the rug upon completion of the cure.

A suitable foamed rubber mix or batch is then poured into the mold to completely cover the rug backing to a desired depth. The specific composition of such batch material forms no part of the present invention and may be mixed in conformance with the disclosure of U. S. Patent No. 1,852,447 to W. H. Chapman. However, any suitable mix prepared by vigorously whipping latex to form a frothed material to which a gelling agent is added will provide a foamed rubber suitable for carrying out the present invention.

Mold 10 with its contents is now ready to be repositioned between electrodes 15 and 16 preparatory to the application of high frequency energy to effect cure of the sponge rubber. Suitable means, not shown, may be provided for moving mold 10 and its contents between plates 15 and 16 and if a conveyor is used for the purpose, the conveyor belt portion extending between electrodes 15 and 16 with mold 10 in position must be substantially of dielectric material. The optimum spacing of plates 15 and 16, while not extremely critical, may be empirically determined and is dependent upon several values such as the volume and composition of foamed sponge rubber mix to be cured, the characteristics and quantity of radio frequency energy employed to effect the cure and the dielectric factor of both the mold and its contents. The illustrated apparatus shows electrode 16 grounded at 35 and it is therefore necessary properly to insulate electrode 15 as a safeguard to personnel. The required capacity of the radio frequency generator may be determined from data currently available in the electronics heating art. The method may of course be performed in reverse order from that above described by pouring the foamed rubber into the bottom of the mold and then positioning the rug, nap up, in the mold, with the bottom surface of the rug in contact with and supported by the foamed rubber.

By the method above described, an extremely effective bond is obtained between sponge rubber 13 and the rough base or backing 12. While it may broadly be stated that the foamed rubber is "vulcanized" to the rug backing, it is probably more accurate to state that the sponge rubber is interstitially bound thereto. The foamed rubber mixed material is not in a "fluid" state, due to its aerated or "frothed" nature, and also to gelling agents having been added just prior to pouring. However, the mix does seep into the fabric rug backing material to an extent to wet or completely surround many of the fibers through the outer surface or fabric, but not to the extent that damage to the rug results. Upon cure, the sponge rubber which has thus seeped into the fabric is firmly anchored therein and can only be removed by destruction of the fibers or threads to which it has attached. It is immaterial, therefore, whether or not the word "vulcanize" is an apt term, and while it is believed that technically no vulcanization takes place between the rubber and the fabric material, obtaining a satisfactory bond is dependent only upon complete cure of the sponge rubber.

Figure 3:
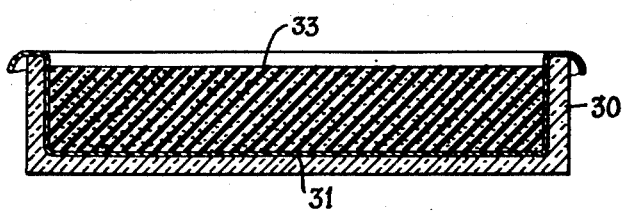
Fig. 3 illustrates in vertical section a fabric lined mold filled with uncured foamed rubber, as hereinafter discussed, illustrating a step in the manufacture of rubber backed fabric.

Fig. 3 illustrates an alternative adaptation of the present invention, showing a mold 30 completely lined with fabric 31, the mold and liner being partially filled with uncured foamed rubber or batched material. The mold and its contents are placed between suitable electrodes of a radio frequency generator, as above described, to effect cure of sponge rubber 33 and simultaneous bonding thereof to fabric 31. The resulting product has many uses and is particularly adapted for use as a rubber-backed upholstery material. An extremely useful product has been obtained by curing sponge rubber to a fabric woven from threads of polyvinyl chloride resin. The resulting product is particularly useful as a furniture upholstering material suitable for furniture subjected to unusual wear such as in public conveyances. The method is, however, not limited to the use of any particular type of fabric 31, and while the method has been particularly successful in obtaining bonds between foamed sponge rubber and non-rubber material, other types of sponge rubber may be employed without departure from the spirit and scope of the invention, as limited only by the appended claims.

What is claimed is:

1. The method of securing a foam rubber layer to the fabric backing material of a rug which comprises disposing said rug with the nap portion extending down to expose the fabric of the rug, pouring foamed latex, while in an uncured state, onto said fabric to form a layer of substantial thickness overlying said material, confining said foamed latex and rub between a pair of parallel mold surfaces, and applying a high frequency field to said mold surfaces.

2. The method of securing a foam rubber layer to the fabric backing material of a rug which comprises disposing said rug with the nap portion extending down to expose the fabric of the rug, pouring foamed latex, while in an uncured state, onto said fabric to form a layer of substantial thickness overlying said material, confining said foamed latex at the sides and confining said foamed latex and rug between a pair of parallel mold surfaces, and applying a high frequency field to said parallel mold surfaces.

3. The method of securing a foam rubber layer to the fabric backing material of a rug which comprises disposing said rug with the nap portion extending down to expose the fabric of the rug, pouring foamed latex, while in an uncured state, onto said fabric to form a layer of substantial thickness overlying said material, confining said foamed latex and rug between a pair of parallel mold surfaces, applying a high frequency field to coagulate or gel said foamed latex between said mold surfaces, and to heat said gelled foamed latex to vulcanize the same as a sponge rubber cushion backing on said rug.

4. The method of securing a foam rubber backing to a porous fabric material which comprises pouring foamed latex, while in an uncured state, onto said fabric material to form a layer of substantially uniform thickness overlying said material, confining said foamed latex at the sides and confining the layer of foam between the fabric and a mold surface extending parallel to the fabric, and thereafter curing said latex by the application of heat.

5. The method of securing a foam rubber backing to a porous fabric material which comprises pouring foamed latex, while in an uncured state, onto said fabric material to form a layer of substantially uniform thickness overlying said material, confining said foamed latex at the sides and confining the layer of foam between the fabric and a mold surface extending parallel to the fabric, and thereafter curing said latex by the application of a high frequency field to vulcanize and dry a sponge rubber backing on said fabric material.

FRED H. MASON.
SAMUEL C. SCHOTT.

REFERENCES CITED

The following references are of record in the file of this patent:

UNITED STATES PATENTS

| Number | Name | Date |
|---|---|---|
| 2,106,385 | Springer | Jan. 25, 1938 |
| 2,217,137 | Roth et al. | Oct. 8, 1940 |
| 2,271,058 | Binns | Jan. 27, 1942 |
| 2,434,573 | Mann | Jan. 13, 1948 |
| 2,441,548 | Sperry | May 11, 1948 |

FOREIGN PATENTS

| Number | Country | Date |
|---|---|---|
| 477,911 | Great Britain | Jan. 10, 1938 |

OTHER REFERENCES

Modern Plastics, "Plastic Molds for Electronic Vulcanizing," pages 142–145, July 1946, Electric Heat Digest.